May 15, 1923.
W. J. O'BRIEN
1,454,856
COOKING VESSEL FOR GLAZING FRUIT
Filed April 25, 1921
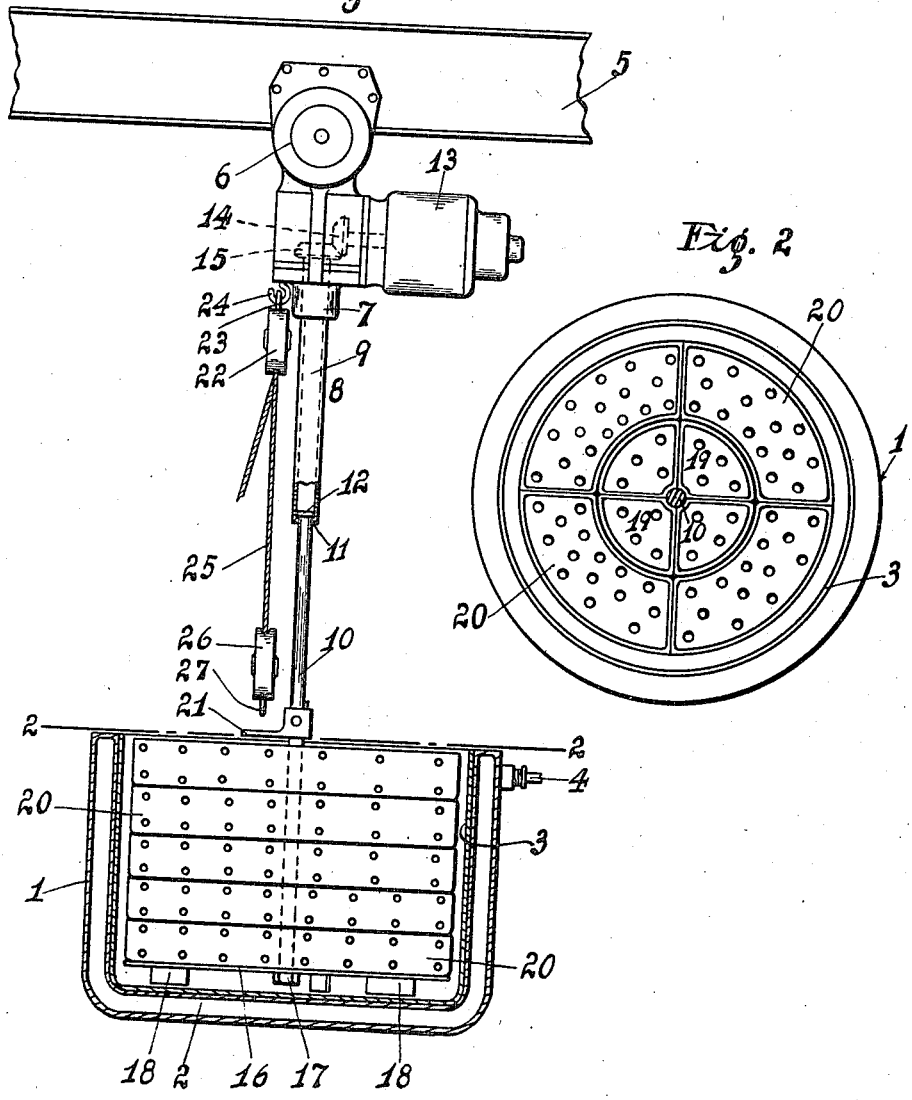
Walter J. O'Brien, Inventor
By Harry C. Schroeder, Attorney Patented May 15, 1923.

1,454,856

UNITED STATES PATENT OFFICE.

WALTER J. O'BRIEN, OF SAN FRANCISCO, CALIFORNIA.

COOKING VESSEL FOR GLAZING FRUIT.

Application filed April 25, 1921. Serial No. 464,477.

*To all whom it may concern:*

Be it known that I, WALTER J. O'BRIEN, a citizen of the United States, residing at San Francisco, in the county of San Francisco and State of California, have invented certain new and useful Improvements in Cooking Vessels for Glazing Fruit, of which the following is a specification.

My invention is an improved cooker, particularly useful for glazing fruit, which contemplates a pan carrier on which the cooking pans may be readily placed or removed and which may be readily lowered into or raised out of the cooking kettle.

Referring to the annexed drawing in which my invention is illustrated and which forms a part of this specification:

Figure 1 is a side elevation of my cooker with the cooking kettle in vertical section.

Figure 2 is a horizontal section of my cooker taken on line 2—2 of Figure 1.

In the drawing 1 indicates a cooking kettle formed with a steam jacket 2 in its bottom and side walls and lined with a glass lining 3. Sugar syrup is placed in said kettle. Steam is admitted into the jacket 2 through a pipe 4. The kettle 1 is located directly below a horizontal beam 5 on which travels a crane 6. In the lower part of said crane in a bearing 7 is journaled a shaft 8 which extends downwardly from the crane. The shaft 8 is made in two sections, an upper square hollow section 9 and a lower section 10 which telescopes in the said hollow section. The lower end of the section 9 is formed with an internal flange 11 and a square head 12 is formed on the upper end of the section 10 which fits closely inside the section 9 and engages said flange and limits the downward movement of the latter section. On the crane 6 is mounted an electric motor 13 on the shaft of which is a bevel gear 14 which meshes with a bevel gear 15 on the upper end of the section 9 of shaft 8. On the lower end of the section 10 of the shaft 8 is a disk 16 which is held on shaft section by a nut 17 on the lower end of said section. Scraper blades 18 depend from the under side of the disk 18. Perforated fruit pans 19 are placed upon the disk 16 around the shaft section 10 and superimposed upon each other, said pans being preferably quadrantal in shape so that four pans are placed around the shaft section in each horizontal plane of the pans. Perforated fruit pans 20 are placed upon the disk 16 and superimposed upon each other around the pans 19, the pans 20 being arcuate in shape and 90° from end to end. On the shaft section 10 above the level of the pans 19 and 20 is secured an arm 21. A block 22 is connected to the crane 6 by hook 23 and eye 24, over the pulleys of which block extends a rope 25 which also extends over the pulleys in a block 26, from which block depends a hook 27 for engaging the arm 21, whereby the shaft section 10, disk 16 and pans 19 and 20 are lowered into or raised out of the cooking kettle 1. When said shaft section, disk and pans are raised out of the kettle the crane 6 and parts carried thereby may be moved along the beam 5 to one side or the other of the kettle 1. When the shaft section 10, disk 16 and pans 19 and 20 are in the kettle said parts may be rotated within the kettle by the motor 13 through the medium of bevel gears 14 and 15, shaft section 9, and head 12. When the disk 16 is rotated the scraper plates 18 scrape the bottom of the kettle and stir the sugar syrup therein.

Having described my invention, I claim:

1. In combination, a cooking kettle, a shaft mounted to be lowered into said kettle and to be raised from said kettle, a disk on the lower end of said shaft, a plurality of cooking pans adapted to be placed upon said disk around said shaft and superimposed upon each other, means for rotating said shaft, and means for lowering said shaft, disk and pans into said kettle and for raising the same out of said kettle.

2. In combination, a cooking kettle, a shaft, a disk on the lower end of said shaft, a plurality of cooking pans constructed to be placed on said disks around said shaft and superimposed upon each other, a plurality of other cooking pans constructed to be placed on said disk around the aforesaid pans and superimposed upon each other, means for rotating said shaft, and means for lowering said shaft, disk and pans into said kettle and for raising the same from the kettle.

3. In combination, a kettle, a telescoping shaft, the lower section of said shaft being constructed to rotate with the upper section and to be raised and lowered in said upper section, means for rotating the upper section, means for lowering said lower section into the kettle and for raising said section from the kettle, and means for mounting a plurality of cooking pans on the lower end of the lower section of said shaft.

In testimony whereof I affix my signature.

WALTER J. O'BRIEN.